United States Patent Office 3,445,563
Patented May 20, 1969

3,445,563
PROCESS OF PREPARING VITAMIN-CONTAINING GELLED AQUEOUS COLLOID BEADS
John Brian Clegg, Ulverston, and Leonard Godfrey Elliott, Great Urswich, near Ulverston, England, assignors to Glaxo Laboratories Limited, Greeford, Middlesex, England, a British company
No Drawing. Filed May 23, 1966, Ser. No. 551,877
Claims priority, application Great Britain, May 28, 1965, 22,814/65
Int. Cl. A61k *15/00*
U.S. Cl. 424—35        15 Claims

ABSTRACT OF THE DISCLOSURE

Gelled aqueous colloid beads, preferably containing at least one vitamin, are prepared by dispersing the liquid aqueous colloid in a gas phase to produce gelled particles which are collected with agitation in a collecting powder which is a mixture of an inorganic flow-promoting powder which is non-sorbent with respect to water and an inorganic water-sorbing powder.

---

This invention concerns an improved method for producing gelled aqueous colloids in free-flowing, particulate or bead form.

It is often advantageous to present pharmaceuticals and other materials by incorporation into beads, or similar particles, of a gelled aqueous colloid such as gelatin or polyvinyl alcohol. In the case of chemicals which deteriorate on exposure to air, for example vitamin A or D, essential oils etc. this method of formulation increases the storage life of the product. In order that beads of colloid should not adhere together, especially when warm, it has been found necessary to harden at least the surface of the beads, and this can conveniently be achieved by surface-drying, followed if required by more complete drying.

It has been proposed to prepared gelatin beads by spraying molten aqueous gelatin into a cooling tower and collecting the solidified beads in a starch collecting powder in order to dry the bead surfaces. The collecting powder must, however, be finely divided and starch in this condition represents an explosion hazard, particularly since the collecting powder should preferably be agitated to ensure efficient contact with the beads.

It is an object of the present invention to provide a method of drying colloid particles wherein the above disadvantage is eliminated. We have found that the starch collecting powder in the previously proposed drying process can be replaced by a completely inorganic collecting powder comprising a flow-promoting component which is substantially non-sorbent with respect to water and a water-sorbent component.

Although starch can be replaced by a water sorbent powder alone this has serious disadvantages for the water sorbent powder in contact with the undried beads tends to cake and flow badly. This makes subsequent mechanical handling very difficult. In particular it is impossible efficiently to separate the beads from the water sorbent powder.

According to the present invention, therefore, we provide a method of producing a free-flowing preparation comprising particles of a gelled aqueous colloid whereby the liquid aqueous colloid is dispersed in a gas phase to produce gelled particles which are then collected in a very finely divided collecting powder consisting essentially of an inorganic flow-promoting powder, which is substantially non-sorbent with respect to water, in admixture with an inorganic water-sorbing powder so that the surface of said particles is hardened by sorption of water into the collecting powder.

The method of the invention is applicable to the production of various colloids in particulate or bead form, for example, gelatin, gum acacia, polyvinyl alcohol etc. Aqueous gelatin is an extremely useful colloid in the preparation of pharmaceutical bead formulations. The aqueous gelatin can advantageously contain a carbohydrate such as glucose, lactose, sorbitol, oxidised starch etc.

The initial water content of the aqueous gelatin depends upon a number of factors such as temperature, bead size required, type of spray head used etc. High water content makes spraying easier but the beads tend to be too soft before drying. Low water content aqueous gelatin needs a high spray temperature with danger of decomposition. A water content in the range 50–60% by weight and a spray temperature of 65° C. have proved suitable.

The flow-promoting component of the collecting powder may be, for example, talc or finely divided silica (Aerosil), talc being especially convenient, possibly due to its laminar form.

The water-sorbing powder may, for example, be an aluminium silicate of an alkali metal or alkaline earth metal such as sodium or calcium aluminium silicate, alumina, calcium silicate, powdered silica gel, magnesium carbonate or magnesium oxide. The most preferred water-sorbing powder is calcium aluminium silicate.

The collecting powder must be very finely divided in order to ensure that a minimum quantity of powder adheres finally to the beads. The powder should thus preferably be such that a substantial percentage thereof will pass through a B.S.S. 300 sieve. The most preferred collecting powders are sufficiently fine for not less than 98% of the powder to pass through a B.S.S. 300 sieve. The powder is preferably agitated to reduce the possibility of tacky beads colliding, for example by landing on top of one another, and so agglomerating.

The ratio of flow promoting powder to water sorbing powder is significant in that too high a ratio reduces the hardening effect on the beads while too low a ratio reduces the ability of the powder to flow freely.

However, this ratio varies considerably from one mixture to another. For instance in an Aerosil/calcium aluminium silicate mixture, 0.1–10% Aerosil is preferred, advantageously 0.5–1.0%. When talc/calcium aluminium silicate is employed, 50–95% talc is preferred, advantageously 60–90%. It may be noted that a mixture of talc and calcium aluminium silicate in the ratio 7:3 possesses better flow properties than either powder alone.

The weight ratio of the collecting powder to the colloid beads must be sufficiently high to prevent agglomeration of the beads. In most cases, a lower limit of 12:1 is advisable. The upper limit to this ratio is merely set by the cost of materials and equipment. A ratio of about 20:1 has been found to be optimal.

The collecting powder should not contain so much sorbed water that its sorbing power or flow-properties are seriously impaired and in general the water content is preferably below 10% by weight, advantageously below 6%. The maximum allowable water-content will, however, vary with the nature and composition of the collecting powder. The initial water-content is preferably not more than 1% by weight.

The gas phase in which the colloid particles are dispersed is conveniently air, preferably dry air. The colloid may advantageously be dispersed by spraying in the molten state from an appropriate spray-head and in order to allow the droplets to solidify they are preferably allowed to fall into the collecting powder through an airspace of appropriate height, for example about 20 feet. This falling period also allows the beads to assume the spherical shape which is normally desirable. Conveniently, therefore, the spray head is situated at the top of a tower sufficiently high to allow the beads to solidify before falling into the collecting powder and sufficiently wide to prevent the sprayed material from contacting the sides. A particularly useful type of spray head is the centrifugal type. The air in the spray-tower is preferably cooled, for example, to about 10° C. or less.

The collecting powder may conveniently be situated on a rotating turntable at the base of the spray tower. Dry powder may be fed continuously into the centre of the table at an appropriate rate relative to the input of beads and the mixture of powder and dried beads removed from the edge of the table, e.g. by knives. The powder may be agitated and moved outwards on the table by means of stationary bars set below the powder surface and at a slight angle to the radius.

When the beads have been in contact with the collecting powder for long enough to harden, for example for a few minutes, they may be separated from the powder e.g. by screening or by using any other suitable device conventional in the art. The beads are then preferably dried still further, for example, down to about 2% moisture and may then be subjected to classification.

By way of illustration, in one preferred method according to the invention, a solution of oil soluble vitamins e.g. vitamins A and $D_3$, together with butylated hydroxyanisole and/or butylated hydroxytoluene, in a fat such as beef tallow is emulsified with aqueous gelatin, preferably containing glucose, and the warm emulsion sprayed from a centrifugal spray head into a chamber of cool air, falling finally into a collecting powder comprising talc and an aluminium silicate, e.g. talc/calcium aluminium silicate (7:3). After a few minutes contact with the collecting powder, the bead/powder mixture is screened and the beads finally dried in a fluidised bed drier.

The collecting powder, after separation from the beads may be dried, e.g. by heating, to reduce the water-content to about 1% or below, and returned to the collecting area.

For the better understanding of the invention, the following examples are given by way of illustration only:

EXAMPLE 1

760 g. of gelatin and 418 g. of glucose were added to 1900 ml. of water. The solution was heated to 65° C. and stirred vigorously. 460 g. of vitamin A palmitate, assayed at 1.5 mega. u./g., 20.8 g. of vitamin $D_3$ oleate assayed at $8.3 \times 10^6$ i.u./g., 160 g. of edible beef tallow, 26 g. of butylated hydroxyanisole and 30 g. of butylated hydroxy toluene were mixed together and heated to 65° C. The oil mix was added to the colloidal solution and the whole stirred vigorously at 65° C. until a stable emulsion was formed. (The term "mega. u." as used herein means "$10^6$ units;" the term "i.u." means "international units.")

The emulsion was then fed to a dispersion device of the centrifugal type. The dispersion into droplets was carried out in a chamber of cool air, temperature 9.5° C. After remaining in cool air for several seconds the partially solidified droplets were collected in dusting powder consisting of talc 7 parts/calcium aluminium silicate 3 parts.

The dusting powder containing the vitamin active particles was then screened to recover the particles. The particles were finally dried in a fluidised bed drier at an air temperature of 60° C.

The free flowing product thus obtained was substantially in the size range 30–120 B.S. mesh. Analytical assessment of the product showed that it contained 355,000 i.u./g. of vitamin A activity and 6% dusting powder.

EXAMPLE 2

760 g. of gelatin and 209 g. of glucose were added to 2050 ml. of water. The solution was heated to 65° C. and stirred vigorously. 460 g. of vitamin A palmitate, assayed at 1.5 mega. u./g., 20.8 g. of vitamin $D_3$ oleate assayed at $8.3 \times 10^6$ i.u./g., 160 g. of edible beef tallow, 26 g. of butylated hydroxyanisole and 30 g. of butylated hydroxy toluene were mixed together and heated to 65° C. The oil mix was added to the colloidal solution and the whole stirred vigorously at 65° C. until a stable emulsion was formed.

The emulsion was then fed to a dispersion device of the centrifugal type. The dispersion into droplets was carried out in a chamber of cool air (3.5° C.). After remaining in cool air for several seconds the partially solidified droplets were collected in dusting powder consisting of talc 4 parts/sodium aluminium silicate 1 part.

The dusting powder containing the vitamin active particles was then screened to recover the particles. The particles were finally dried in a fluidised bed drier at an air temperature of 60° C.

The free flowing product thus obtained was substantially in the size range 30–120 B.S. mesh. Analytical assessment of the product showed that it contained 346,000 i.u./g. of vitamin A activity and 14% dusting powder.

EXAMPLE 3

In the manner described in Example 1, an emulsion was made consisting of gelatin 760 g., glucose 418 g., water 2050 ml. Vitamin A palmitate 600 g. assayed at 1.76 mega. u./g., tallow 40 g., butylated hydroxy anisole 26 g. and butylated hydroxy toluene 30 g. The emulsion thus obtained was formed into particles in a chamber (as outlined in Example 1) containing air at 7° C. Collection of the particles in dusting powder and further treatment was the same as that previously mentioned. The free flowing product obtained was substantially in the size range 30–120 B.S. mesh and contained a vitamin A activity of 532,000 i.u./g. and 7% dusting powder.

EXAMPLE 4

In the manner described in Example 1, an emulsion was made consisting of gelatin 855 g., glucose 320 g., NaOH 4 g., water 2031 ml., vitamin A palmitate 501 g. assayed at 1.32 mega. u./g., vitamin $D_3$ 21 g. assayed at $7.85 \times 10^6$ i.u./g., tallow 118 g., butylated hydroxy anisole 26 g. and butylated hydroxy toluene 30 g. The emulsion thus obtained was formed into particles in a chamber (as outlined in Example 1) containing air at 7° C. Collection of the particles in dusting powder and further treatment was the same as that previously mentioned. The free flowing product obtained was substantially in the size range 30–120 B.S. mesh and contained a vitamin A activity of 342,500 i.u./g. and 8% dusting powder.

EXAMPLE 5

In the manner described in Example 1, an emulsion was made consisting of gelatin 150 g., oxidised starch 83.3 g., water 405 ml., vitamin A palmitate 110 g. assayed at 1.41 mega. u./g., tallow 18 g., butylated hydroxy toluene 5.2 g. and butylated hydroxyanisole 6.0 g. The emulsion thus obtained was formed into particles in a manner as outlined in Example 1 at an air temperature of 20° C. Collection of the particles in dusting powder and further treatment was the same as that previously mentioned. The beads in the size range 30–120 mesh contained 245,000 i.u. of vitamin A/g. and 19% dusting powder.

EXAMPLE 6

In the manner described in Example 1, an emulsion was made consisting of gelatin 225 g., water 607 ml., vitamin A palmitate 110 g. assayed at 1.41 mega. u./g., tallow 18 g., butylated hydroxy anisole 5.2 g. and butylated hydroxy toluene 6.0 g. The emulsion thus obtained was formed into particles in a manner as outlined in Example 1, at an air temperature of 20° C. Collection of the particles in dusting powder and further treatment was the same as that previously mentioned. The beads had a potency of 341,000 i.u. vitamin A/g. and contained 21–5% dusting powder.

EXAMPLE 7

By procedures analogous to those used in previous examples, beads were made using gum acacia 1,178 g., water 2,590 ml., arachis oil 600 g., tallow 40 g., butylated hydroxy anisole 26 g., and butylated hydroxy toluene 30 g. The beads were substantially in the size range 30–120 mesh.

EXAMPLE 8

198 g. of gelatin and 113 g. of glucose were dissolved in 605 g. of water at 65° C., 49 g. of vitamin $B_{12}$, assayed at 80% was added to the colloidal solution. The solution was dispersed by a rotating disc into air at a temperature of 20° C. The solidified droplets were collected in dusting powder, consisting of talc 7 parts, calcium aluminium silicate 3 parts.

The dusting powder containing the vitamin active particles was then screened to